Figure 1:
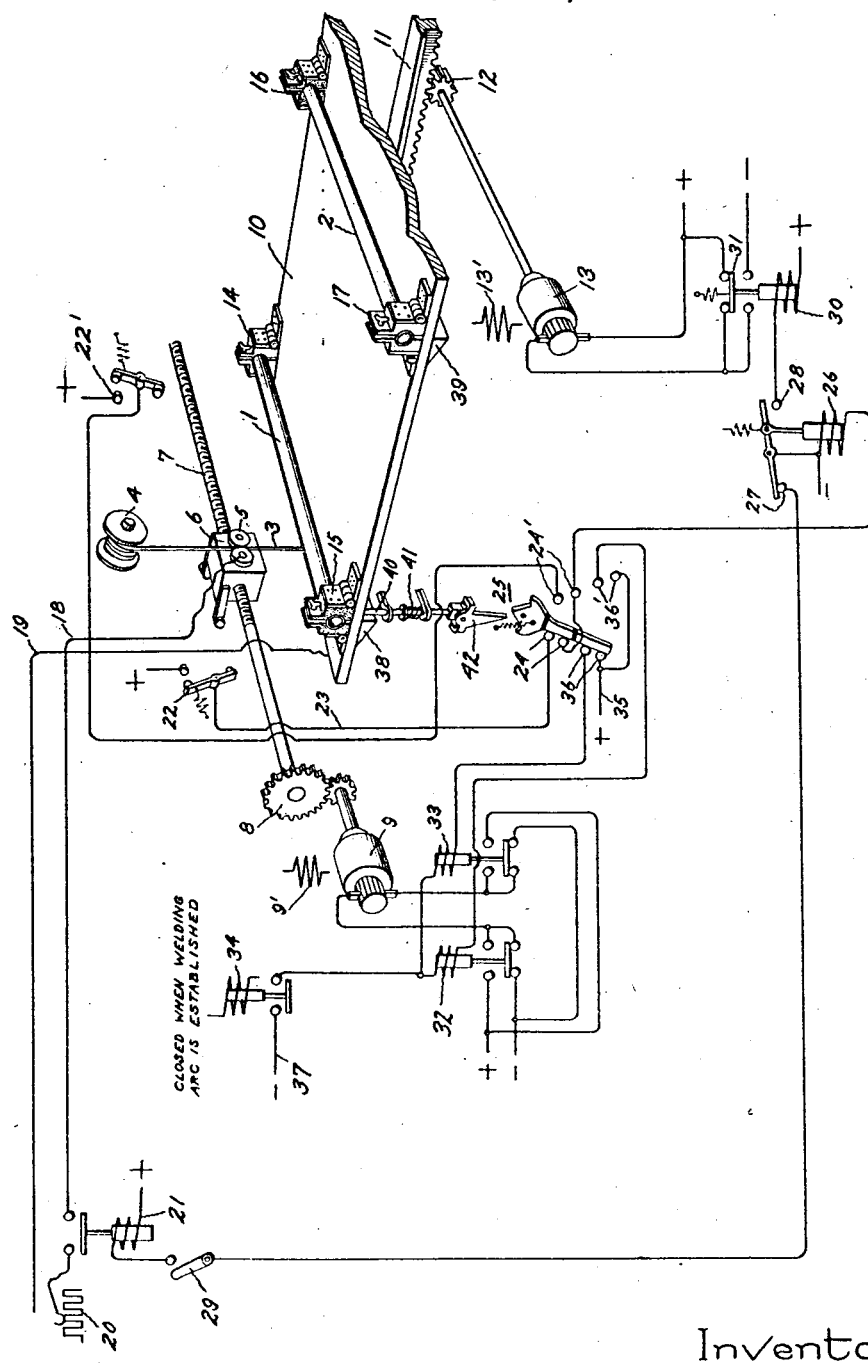

June 2, 1925. 1,540,705

P. O. NOBLE

ARC WELDING APPARATUS

Filed Sept. 16, 1924  3 Sheets-Sheet 1

Inventor:
Paul O. Noble,
by *[signature]*
His Attorney.

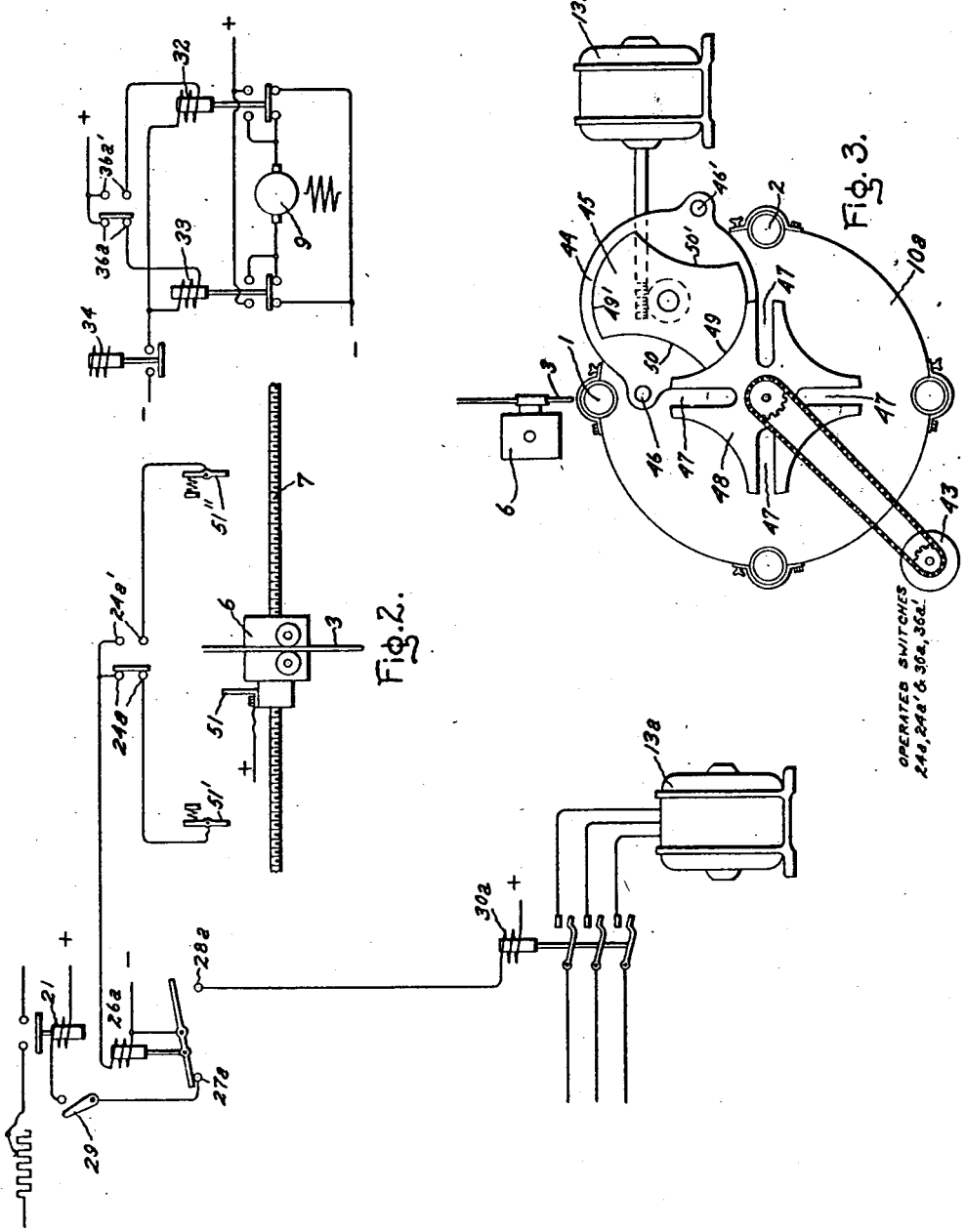

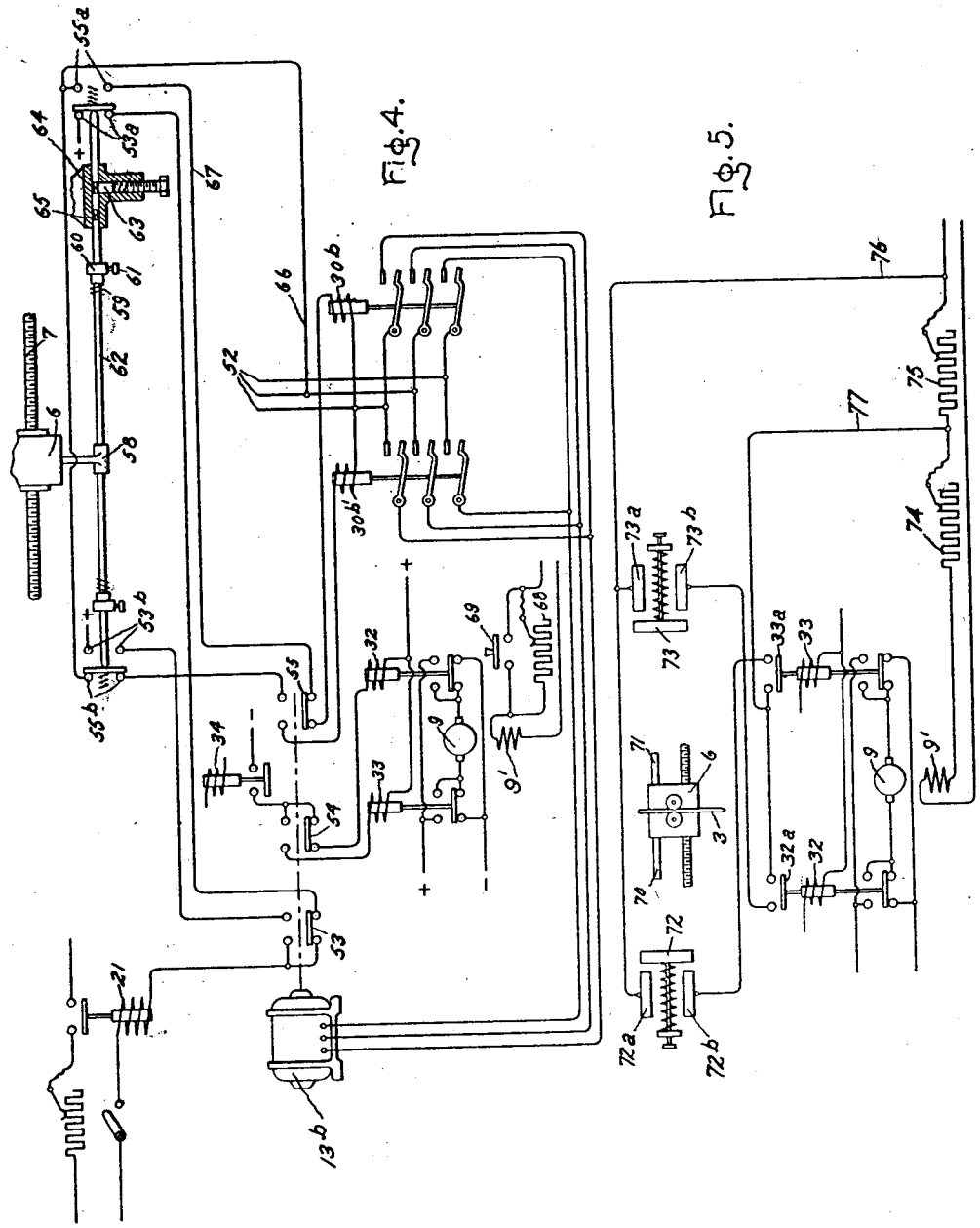

Patented June 2, 1925.

1,540,705

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

ARC-WELDING APPARATUS.

Application filed September 16, 1924. Serial No. 738,093.

*To all whom it may concern:*

Be it known that I, PAUL O. NOBLE, a citizen of the United States, residing at Schenectady, in the county of Schenectady, State of New York, have invented certain new and useful Improvements in Arc-Welding Apparatus, of which the following is a specification.

My invention relates to machines for automatic arc welding and more particularly to an improved arrangement for welding a plurality of seam welds in succession.

My invention will be understood from the following description taken in connection with the accompanying drawings, and its scope will be pointed out in the appended claims.

In the accompanying drawings, Fig. 1 is a diagrammatic showing of an automatic arc welding equipment embodying my invention; Figs. 2 and 3 illustrate a modified construction; Fig. 4 illustrates a further modification, and Fig. 5 illustrates a control feature which may be utilized in any of the modifications illustrated.

Referring to Fig. 1 the work to be welded is represented as a series of articles, shown as tubes 1 and 2, each of which is to be welded along a seam or joint on the upper side thereof. The type of welding machine shown is one in which the welding arc is maintained between the work and a metallic electrode. The tube 1, which is shown in position for welding, represents the work and the metallic electrode is shown at 3. This electrode is shown as being drawn from a reel 4 by means of electrode feeding mechanism represented by the feed rolls 5 mounted on the welding head 6. In automatic welding machines of this type, it is now common to provide means for operating the feed rolls so as to feed the electrode 3 into contact with the work, then withdraw the electrode slightly to establish the welding arc and then feed the electrode continuously forward at the proper rate to maintain the welding arc at substantially constant length. The metallic electrode is consumed and the metal thereof deposited upon the work and integrally united therewith. The means for feeding the electrode automatically to strike and maintain the arc are not illustrated since any suitable means may be used and such means form no part of my present invention. One means which may be used is disclosed in my Letters Patent No. 1,508,710, dated Sept. 16, 1924.

In order to weld along the line of the seam to be welded means are provided for producing relative movement between the electrode and the work to traverse the arc along the desired line. In Fig. 1, the welding head 6 is arranged to be moved with respect to the work, this movement being accomplished by means shown as a lead screw 7, operated through suitable gearing 8 from a motor 9, whose field winding is indicated at 9'. The welding arc is started at one end of the seam to be welded and the arc traversed along the line of the joint to the other end. The traversing motion is then stopped by stopping the motor 9 and another seam to be welded is then moved into position for welding. In the arrangement shown, when the welding of the seam in tube 1 has been completed, the tube 2 is moved laterally into welding position under the welding head, the arc is then started at the end of the tube 2 and the arc traversed along the tube 2 so that the seam is made by moving the welding head in the reverse direction from its movement while welding the tube 1. Any suitable means may be provided for laterally presenting and positioning the articles for welding. In the arrangement illustrated in Fig. 1, the tubes are shown as mounted on a supporting means 10 comprising a flat table moved by means indicated as a rack 11 and pinion 12 operated by a motor 13, the field winding of the motor being shown at 13'. The tubes 1 and 2 are secured to the work supporting table 10 by suitable holding clamps. The clamps for the tube 1 are shown at 14 and 15 and the clamps for the tube 2 at 16 and 17. The clamps 15 and 16 are indicated as provided with insulation while the clamps 14 and 17 are uninsulated. The tube 1 is thus in conductive connection with the work supporting table 10 at the end 14 and the tube 2 in conductive connection at the end 17. The purpose of thus insulating alternate ends of the articles to be successively welded is to transfer the ground or return connection to the welding circuit from one end to the other between the welding of successive seams. The electrode 3 is connected to one side of the welding circuit as indicated by the lead 18 and the work supporting table 10 is connected to the other side of the welding circuit as indicated by the lead 19. The welding current thus flows from the main 19 to the table 10, thence through the clamp 14 into one end of the tube 1, thence through the welding arc to the electrode 3 to the main 18. When the tube 2 is being welded the current enters the tube 2 at the clamp 17 which is at the opposite end of the table 10 from the clamp 14. The welding of tube 1 begins at the clamp 14 and proceeds from right to left in the drawing while the welding of the tube 2 begins at the clamp 17 and proceeds from left to right. The so-called ground connection 19 is thus always made at the end of the seam where welding begins irrespective of the direction of welding, the ground connection being reversed or transferred whenever the direction of welding is reversed. The current flowing in the electrode and work produces a magnetic field which deflects the arc and I have found that the arc is more stable and the welding improved by thus transferring the ground connection.

Any suitable source of supply may be used for furnishing current to the welding circuit. If a constant potential source of supply is used a stabilizing resistor 20 will be used. It is also customary to insert reactance in the welding circuit to assist in preventing the interruption of the arc. A switch having an operating winding 21 is shown for opening and closing the welding circuit. The various connections for controlling the operation of the machine will now be set forth in connection with a description of the mode of operation.

The sequence of operation is as follows: The arc is started at the right hand end of the tube 1. The arc traversing motor 9 is then started and the seam is welded from right to left. When the welding of tube 1 has been completed, the arc traversing motor 9 is stopped and the welding circuit interrupted. The motor 13 then operates to present the tube 2 to welding position and then stops. The arc is then started at the left hand end of tube 2 and the arc traversing motor 9 started in the reverse direction so that the tube 2 is welded from left to right. The next tube (not shown) is welded from right to left and so on. While one tube is being welded, the operator of the machine clamps the other tube in position for welding and removes the tube which has been welded.

Assuming that the tube 1 is being welded, the motor 9 will be operating in a direction to move the welding head 6 from right to left. When the end of the seam has been reached, limit switch 22 is closed thus completing a circuit from any suitable source through the lead 23, contacts 24 of the switch 25 through the operating winding of relay 26. Relay 26 opens the circuit at the contact 27 and closes the circuit at contact 28. The opening of contact 27 deenergizes the coil of switch 21 and the welding circuit is interrupted. The switch 29 in the circuit of winding 21 is merely illustrative of a control switch which the operator closes when he desires to begin welding. The closing of contact 28 energizes the coil 30 of a switch for controlling the operation of the work moving motor 13. This switch is shown as comprising a contact 31 which normally completes a circuit across the motor brushes for dynamically braking the motor 13. When the coil 30 is energized, contact 31 opens the braking circuit and connects the motor to any suitable source of supply for operating the motor to present a new tube to be welded. When the welding circuit was opened by the deenergization of coil 21, the arc traversing motor 9 was stopped. The operation of the arc traversing motor is shown as controlled by a pair of reversing contactors 32 and 33. The circuits of these contactors are controlled by the switch 25 and also by the relay 34 which is connected in a manner, now well known in the art, so as to be energized only while the welding arc is established. During the welding of the tube 1 from right to left relay 34 was energized and the contactor 33 was energized, the circuit for the operating coil of contactor 33 being from the lead 35 through the contacts 36 of switch 25 through coil 33 and contacts of relay 34 to the lead 37. Leads 35 and 37 may be supplied from any convenient source. The opening of relay 34 upon the interruption of the arc deenergizes contactor 33 so that both contactors 32 and 33 are in their lower positions completing a dynamic braking circuit for the motor 9.

The closing of the limit switch 22 at the end of the seam in tube 1 thus causes the opening of the welding circuit, the stopping of the arc traversing motor 9 and the starting of the motor 13. The operation of the motor 13 moves the tube 2 into welding position and when the welding position has been reached switch 25 is thrown to the other position from that shown. The throwing of the switch 25 is indicated as accomplished by cam-shaped lugs 38 and 39 on the work supporting table 10. These lugs press down on the plunger 40 and move it against the action of the spring 41. As soon as a lug passes the plunger the plunger is retracted by the spring. The pivoted dog 42 on the end of the plunger actuates the contact member of the switch 25 to throw it to one position upon one depression of the plunger and to the other position upon the next depression of the plunger in a manner well known in the art. When the tube 2 reaches welding position and the switch 25 is thrown, the contacts 24 are opened thereby deenergizing the coil of the relay 26. Contacts 24' are closed but the circuit through these contacts leads through the limit switch 22' so that coil 26 remains deenergized until the switch 22' is closed which closing occurs when the welding head reaches the other end of the seam in tube 2. Upon the deenergization of coil 26 contact 28 is broken thereby deenergizing the coil 30 and stopping the work moving motor 13 and contact 27 is closed thereby energizing coil 21 and again closing the welding circuit. Upon the closing of the welding circuit the electrode feeding mechanism operates to feed the electrode 3 to strike the arc and withdraw it to establish the arc and when the arc has been established relay 34 closes. The closing of relay 34 completes a circuit from the lead 35 through the contacts 36' of the switch 25 through the coil of contactor 32 and the contacts of relay 34 to the lead 37. Contactor 32 thus closes and starts the arc traversing motor 9 in a direction to weld the tube 2 from left to right. When the seam in tube 2 has been completed limit switch 22' closes thereby again energizing relay 26, this time through the contacts 24' of switch 25. Relay 26 causes the opening of the welding circuit, the stopping of the arc traversing motor 9 and the starting of the work moving motor 13 as heretofore described to present a new tube to be welded. When the new tube reaches the proper welding position, switch 25 is again thrown thereby again deenergizing relay 26 and closing the contacts 36 so that, when relay 34 is closed upon the establishing of the welding arc, contactor 33 is energized to traverse the arc from right to left.

In the foregoing description I have stated that the relay 34 may be connected in a manner now well known in the art to be energized only when the welding arc has been established. There are various ways in which the relay 34 may be connected to accomplish this result. One suitable way is to connect the relay 34 across the arc through contacts of another relay which are closed when the arc voltage is below a predetermined value and opened when the arc voltage is above such value. Such an arrangement is described in my Letters Patent No. 1,508,710, heretofore referred to. Another way of connecting the relay 34 is that disclosed in Letters Patent to Eugene R. Carichoff, No. 1,508,742, dated September 16, 1924, and assigned to the same assignee as the present application. In that arrangement series and shunt contactors are provided for controlling an electrode feed motor and the shunt contactor, which corresponds in its operation to relay 34, is controlled by the series contactor so that the shunt contactor can be operated only while welding current is flowing and will be closed only when the arc voltage is above a predetermined value.

It is apparent that my invention is not limited to any particular form of switch 25 nor any particular arrangement or location of this switch other than that it shall cooperate to accomplish the functions described. For the purpose of simplifying the illustration and description I have shown the table 10 as operated in but one direction to present the tubes to welding position. The table may, however, be arranged for both directions of operation. It will also be apparent that it is immaterial as far as my invention is concerned whether or not the work supporting means comprise a flat table or a rotatable structure which presents the articles to be welded in succession. A rotatable structure for supporting the articles to be welded is shown in Fig. 3 and a modified arrangement of the control means is shown in Figs. 2 and 3 to accomplish the same functions as are accomplished by the control means in Fig. 1.

Referring to Figs. 2 and 3 the welding head 6 is traversed along the seams to be welded by the shaft 7 driven from the motor 9 as in Fig. 1. The work moving motor is shown as an alternating current motor 13$^a$. The circuit of the motor 13$^a$ is controlled by a switch 30$^a$, which is in turn controlled by the relay 26$^a$ which corresponds to the relay 26 of Fig. 1. The switch 21 controls the welding circuit, as in Fig. 1, but certain of the connections are omitted for the purpose of making the showing simple and more readily understandable. The arc traversing motor 9 is provided with a pair of reversing contactors 32 and 33 as in Fig. 1. The arc voltage-control relay 34 is connected so as to close the contacts of the relay when the arc has been established as described in connection with Fig. 1. The switch contacts 36$^a$ and 36$^{a\prime}$ of Fig. 2 cooperate with the reversing contactors 32 and 33 in the same way that contacts 36 and 36' of the switch 25 of Fig. 1 cooperate with said contactors. The switch contacts 24$^a$ and 24$^{a\prime}$ cooperate with the relay 26$^a$ in the same way that the contacts 24 and 24' of Fig. 1 cooperate with the relay 26. In the arrangement of Figs. 2 and 3, however, the switches 24$^a$, 24$^{a\prime}$ and 36$^a$, 36$^{a\prime}$ are mounted on a controller drum 43 driven with the rotatable work support 10$^a$ by the motor 13$^a$. The controller drum 43 moves with the work supporting means and turns when the work supporting means turns so that contacts may be arranged thereon to open and close circuits in the same sequence that they are opened and closed by the switch 25 of Fig. 1.

In Fig. 3 the rotatable support 10$^a$ for the tubes to be welded is indicated as operated by the well known Geneva movement which need be but briefly described. The motor 13ª through suitable gearing drives the member 44 and the member 45. The member 44 is provided with a pair of lugs 46 and 46' which cooperate with slots 47 in the member 48 which turns with the work supporting means 10ª. The member 45 is provided with curved surfaces 49 and 49' which cooperate with corresponding surfaces in the member 48 to hold the work supporting means 10ª in certain definite positions. At each operation the motor 13ª operates the member 44 to give the supporting member 10ª a quarter of a turn to present and position a new article for welding. When the motor 13ª starts with the parts in the position shown in Fig. 3, the lug 46 enters a slot 47. The member 45 is cut away at 50 and 50' so that after the lug 46 enters the slot 47 the member 48 may turn. When the member 45 has turned through a half revolution the member 10ª will have been turned a quarter of a revolution and locked in its new position.

Assuming that with the arrangement of Figs. 2 and 3 the welding head 6 is moving from right to left in Fig. 2 to weld a seam, when the end of the seam has been reached the contact 51 will engage the contact 51' and complete a circuit through contacts 24ª to energize the relay 26ª. This relay will open the contact 27ª and close the contact 28ª. Opening of the contact 27ª will open the welding circuit switch 21 thereby causing the deenergization of the relay 34 and stopping of the arc traversing motor 9, as in the arrangement of Fig. 1. The closing of contact 28ª will energize the switch 30ª to start the work moving motor 13ª. When the motor 13ª, through the Geneva movement, has presented a new tube to the proper position for welding, the drum 43 opens the contacts 24ª and closes the contacts 24ª' and opens the contacts 36ª and closes the contacts 36ª'. Opening of the contacts 24ª deenergizes the relay 26ª which closes contact 27ª to cause the closing of the welding circuit and opens contact 28ª to cause the stopping of the work moving motor 13ª. When the welding arc has been established relay 34 closes and a circuit is completed through the contacts 36ª', the operating coil of contactor 32 and the contacts of the relay 34 to close the contactor 32 and start the arc traversing motor 9 into operation to move the welding head and traverse the arc along the new tube from left to right. When the right hand end of the new seam has been reached contact 51 on the welding head will engage contact 51'' and complete a circuit through the contacts 24ª', which are now closed, thereby again energizing relay 26ª to cause the opening of the welding circuit, the starting of the work moving motor 13ª and the throwing of the drum 43 with its switches to the other position. It will be observed that contacts 51, 51' and 51'' correspond to the limit switches 22 and 22' of Fig. 1.

The work holding clamps on the rotatable work-supporting means 10ª are preferably insulated at alternate ends of the tubes to be welded, as in the arrangement of Fig. 1 so that the ground connection is transferred between successive welds.

While I have shown the means for transferring the ground connection as comprising insulated and uninsulated clamps for holding the articles to be welded it is apparent that my invention is not limited to this arrangement since, as far as the broader aspects of my invention are concerned, it is immaterial whether the ground connection is transferred in this manner or by other means such for example as a switch or switches, which is or are automatically thrown to establish the desired ground connection. With such an arrangement, all of the work holding clamps might be insulated.

Fig. 4 shows a somewhat modified arrangement of the control mechanism. The welding head 6 is indicated as moved by the screw 7 and this screw is operated by the arc traversing motor 9 controlled by the reversing contactors 32 and 33 as in the arrangement of Fig. 1. The work moving motor is shown at 13ᵇ and the circuit of this motor is indicated as controlled by a pair of contactors 30ᵇ and 30ᵇ'. The closing of either one of these contactors completes a circuit from the alternating current supply mains 52 to the motor 13ᵇ and the motor is operated in the same direction upon the closing of either contactor. Operated by the work moving motor 13ᵇ are three sets of controller contacts 53, 54 and 55. The contact 54 cooperates with the relay 34 in controlling the reversing contactors 32 and 33 for the arc traversing motor 9 in the same manner as do the contacts 36ª and 36ª' of the controller drum 43 of Figs. 2 and 3. The contact 55 cooperates with the limit switch contacts 55ª and 55ᵇ to control the contactors 30ᵇ and 30ᵇ' for the work moving motor 13ᵇ. The contact 53 cooperates with the limit switch contacts 53ª and 53ᵇ to control the switch 21 for the welding circuit.

Assuming that a seam is being welded with a movement of the welding head 6 of Fig. 4 from left to right, near the end of the seam the member 58 on the welding head engages a spring 59 on the stop 60 secured as, for example, by a set screw 61 to the rod 62. Continued movement of the welding head compresses the spring 59. The rod 62 is held against movement by the spring-pressed plunger 63 which engages a groove 64 in the rod 62. At the end of the seam the pressure on the spring 59 is sufficient to overcome the holding action of plunger 63 and the rod 62 moves quickly to the right and the plunger 63 engages the groove 65 in the rod. This movement of the rod 62 opens the contacts 53ᵃ and closes the contacts 55ᵃ. At the same time contacts 55ᵇ open and contacts 53ᵇ close. The rod 62 and limit switches remain in the new position until the welding head 6 has reached the left hand end of its travel during welding of the next seam, whereupon the limit switch contacts will again move to the position illustrated.

The opening of contacts 53ᵃ at the end of the seam opens the control circuit through the coil 21 thus interrupting the welding circuit. The closing of contacts 55ᵃ causes the work moving motor 13ᵇ to be started into operation. The control circuit through the contacts 55ᵃ may be supplied from any convenient source. As indicated in Fig. 4 the supply is taken from the mains 52. The closing of contacts 55ᵃ completes a circuit through lead 66, contacts 55ᵃ, lead 67, contacts 55 to the operating coil of contactor 30ᵇ. This contactor closes thus starting the work moving motor 13ᵇ. In the meantime the arc traversing motor 9 has been stopped by reason of the dropping out of arc voltage relay 34 which opens the circuit of the contactor 32.

When the motor 13ᵇ has operated to position a new article for welding, the contacts 53, 54 and 55 are moved to their other positions. Contact 53 completes a circuit leading through contacts 53ᵇ, which are now closed, contact 53, which is now in the upper position of Fig. 4, through the coil 21 thereby energizing this coil and closing the welding circuit. Contact 54 is now in its upper position so that when the arc voltage relay 34 closes, contactor 33 will be energized to operate the arc traversing motor 9 to move the welding head from right to left. The moving of contact 55 to its upper position breaks the circuit heretofore traced through the coil of contactor 30ᵇ so that this contactor opens and thereby stops work moving motor 13ᵇ. Welding proceeds on the new seam until the end of the seam is reached when the rod 62 is thrown over to the position shown in Fig. 4. This causes the opening of the welding circuit, the stopping of the arc traversing motor 9 and the starting of the motor 13ᵇ, which operates to position the new seam for welding, at which time the motor 13ᵇ stops and the welding is begun in the other direction.

In certain classes of work, it may be necessary to traverse the arc more slowly along the seam to be welded at certain portions of the seam. For example, where the ends of the tube or other article are to be machined, it may be desirable to slow down the rate of travel of the arc for a few inches at each end of the seam. This may be done by varying the speed of the arc traversing motor 9 in any convenient manner. As illustrated in Fig. 4, a resistance 68 is shown in the circuit of the field winding 9′ of the motor 9. By closing the switch 69, indicated as a push button, the operator can short circuit the resistance 68 thereby increasing the current in the field winding 9′ of the motor thus slowing the motor down.

It is apparent that instead of controlling the switch 69 of Fig. 4 manually to slow down the arc traversing motor, the result may be accomplished automatically by operating this switch in accordance with the position of the welding head. Such an arrangement is diagrammatically shown in Fig. 5 wherein the connections are such as to reduce the rate of travel of the welding head near the end of each seam. In Fig. 5 the arc traversing motor 9 is controlled by reversing contactors 32 and 33 as heretofore described. The welding head 6 is provided with means indicated as projections 70 and 71 cooperating respectively with contacts 72 and 73. Contact 72 is arranged to bridge and slide along contacts 72ᵃ and 72ᵇ. Contact 73 similarly bridges and slides along contacts 73ᵃ and 73ᵇ. In the circuit of the field winding 9′ of the arc traversing motor a resistance 74 is shown which may be adjusted for any desired speed of the motor. An additional resistance 75 is shown in the circuit and the contacts 72 and 73 control a short circuit around resistance 75 to secure the desired change in speed of the arc traversing motor. If, for example, it were desired to have the motor 9 run more slowly during the first and last 6 inches of each tube the contacts 72 and 73 would be so arranged during such length of the seam that when either was in engagement with its cooperating contacts, the resistance 75 would be short circuited and the field winding 9′ strengthened. In the arrangement shown in Fig. 5, however, it is assumed that it is desired to have the lower speed during the last 6 inches only of each seam. The accomplish this result, the circuits controlled by contacts 72 and 73 are interlocked with the contactors 32 and 33 for controlling the direction of operation of the motor 9. This is accomplished by providing interlock contacts 32ᵃ and 33ᵃ on the respective contactors 32 and 33.

The operation of the arrangement shown in Fig. 5 is as follows: Assuming that a tube is being welded from right to left, when the welding head 6 nears the end of the seam the projection 70 moves the contact 72 so as to bridge the contacts 72ᵃ and 72ᵇ. A circuit is thus completed around the resistance 75 as follows: From the lead 76, contact 72, contact 33 of contactor 33, which is now closed, and lead 77 to the other side of resistance 75. When the end of the seam has been reached contactor 33 drops out opening contact 33ª and opening the short circuit just traced around the resistance 75. When the reverse movement is begun, contactor 32 closes but no circuit is completed around the resistance 75 until the projection 71 causes contact 73 to bridge the contacts 73ª and 73ᵇ near the end of the seam in the reverse direction. The arc traversing motor 9 is thus caused to operate more slowly near the end of each seam.

What I claim as new and desire to secure by Letters Patent of the United States, is:—

1. An automatic arc welding machine for seam welding comprising a welding head having means for maintaining an arc, means for supporting work comprising a plurality of seams to be welded, means for effecting relative movement longitudinally between said welding head and supporting means to traverse the arc along a seam to be welded, means for effecting relative movement laterally between said supporting means and said welding head to position and parts for welding successive seams, and control means for stopping said traversing motion upon the completion of a seam and causing operation of said means to position the parts for welding another of said seams.

2. An automatic arc welding machine for seam welding comprising a welding head having means for maintaining an arc, means for supporting a plurality of articles to be welded, means for moving said welding head with respect to said supporting means to traverse the arc along a seam to be welded, means for moving said supporting means to present the articles laterally to welding position with respect to said welding head, and means arranged upon the completion of a seam in one article to stop said traversing motion and move said work supporting means to position another article for welding.

3. An automatic arc welding machine for seam welding comprising a welding head having means for automatically striking and maintaining an arc, means for supporting work comprising a plurality of seams to be welded, means for moving said welding head with respect to said supporting means to traverse the arc along a seam to be welded, means for reversing the operation of said traversing means whereby seams may be welded in either direction, means for operating said work supporting means to present the seams laterally and position them for welding, a switch for controlling the circuit of the arc, and means arranged upon the completion of a seam to stop said traversing motion, open said switch and set said work supporting means into operation to present another seam to be welded, said means being arranged and connected so that when the new seam occupies the proper position for welding the movement of said work supporting means is stopped, said switch closed and said means for reversing the operation of said traversing means operated.

4. An automatic arc welding machine for seam welding of the type wherein the arc is maintained between the work and a metallic electrode and wherein means are provided for automatically striking and maintaining the arc, comprising means for supporting a plurality of articles to be welded arranged to be successively operated to a plurality of welding positions, a motor for operating said work supporting means, means comprising a reversible motor for traversing the arc along a seam to be welded, a switch for controlling the circuit of the arc, means comprising a limit switch arranged to be operated upon the completion of the welding of a seam to stop said traversing motor, operate said switch to open the circuit of the arc, and complete a circuit to said motor for operating the work supporting means to present another seam for welding, and means arranged when the new seam reaches welding position to stop said motor operating the work supporting means, close said switch controlling the circuit of the arc, and reverse the connections to said motor for traversing the arc whereby the successive seams are welded in opposite directions.

5. An automatic arc welding machine as set forth in claim 4 comprising means responsive to the arc voltage for controlling the circuit of said motor for traversing the arc.

6. An automatic arc welding machine as set forth in claim 4 comprising means arranged to connect alternate ends of successive articles to the welding circuit the connection being made at the end of the seam where welding is begun.

7. An automatic arc welding machine of the type wherein the arc is maintained between an electrode connected to one side of the welding circuit and the work connected to the other side of the welding circuit, comprising means for producing relative motion between the work and the electrode to traverse the arc along the seam to be welded, means for reversing the operation of said traversing means to make successive seams in opposite directions, and means for transferring the connection between the welding circuit and the work from one end of the work to the other between the welding of successive seams, said means being arranged to make the connection at the end of the work where the welding of a seam is begun.

8. An automatic arc welding machine of the type wherein the arc is maintained between the work and a metallic electrode comprising a welding head having means for feeding the electrode to maintain the arc, reversible means for producing relative motion between the welding head and the work to traverse the arc along the seam to be welded whereby successive seams may be welded in opposite directions, work supporting means comprising means for holding a plurality of articles to be welded, and arranged to be moved to present said articles laterally in succession to welding position said work supporting and holding means being arranged to insulate alternate ends of the successive articles and establish electrical connection between the other ends and one side of a welding circuit, the arrangement being such that electrical connection is established at the end of the article where welding is begun.

9. An automatic arc welding machine of the type wherein the arc is maintained between the work and a welding electrode the work and electrode being connected to the respective sides of a welding circuit, and wherein means are provided for producing relative movement in either direction between the work and the electrode to traverse the arc along the joint to be welded whereby seams may be welded in either direction, comprising a work supporting means arranged to hold a plurality of articles seams in which are to be welded in opposite directions, and means for establishing the electrical connection between the work and one side of the circuit at the end of the work where welding of a seam is begun irrespective of the direction of welding.

In witness whereof, I have hereunto set my hand this 15th day of September, 1924.

PAUL O. NOBLE.